(12) United States Patent
Reiter et al.

(10) Patent No.: US 10,393,025 B2
(45) Date of Patent: Aug. 27, 2019

(54) SEALING ARRANGEMENT AT THE INTERFACE BETWEEN A COMBUSTOR AND A TURBINE OF A GAS TURBINE AND GAS TURBINE WITH SUCH A SEALING ARRANGEMENT

(71) Applicant: ANSALDO ENERGIA SWITZERLAND AG, Baden (CH)

(72) Inventors: Wilhelm Reiter, Küssaberg (DE); Jost Imfeld, Scherz (CH); Marcos Escudero-Olano, Zürich (CH)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 509 days.

(21) Appl. No.: 14/851,397

(22) Filed: Sep. 11, 2015

(65) Prior Publication Data

US 2016/0076454 A1    Mar. 17, 2016

(30) Foreign Application Priority Data

Sep. 16, 2014  (EP) .................................... 14185021

(51) Int. Cl.
*F01D 9/02*    (2006.01)
*F01D 11/00*   (2006.01)
(Continued)

(52) U.S. Cl.
CPC ................ *F02C 7/28* (2013.01); *F01D 9/023* (2013.01); *F02C 3/04* (2013.01); *F02C 9/22* (2013.01);
(Continued)

(58) Field of Classification Search
CPC .......... F23R 3/60; F01D 9/023; F01D 11/003; F01D 11/005; F05D 2220/40;
(Continued)

(56) References Cited

U.S. PATENT DOCUMENTS 2,592,060 A * 4/1952 Oulianoff ................ F01D 9/023
                                                    285/223
3,909,155 A   9/1975 Whinfrey
(Continued)

FOREIGN PATENT DOCUMENTS

CN    1037759 A    12/1989
CN    1936277 A     3/2007
(Continued)

OTHER PUBLICATIONS

Chinese Office Action dated May 15, 2018, by the Chinese Patent Office in corresponding Chinese Patent Application No. 201510587931. 0. (5 pages).

*Primary Examiner* — Todd E Manahan
*Assistant Examiner* — Eric W Linderman
(74) *Attorney, Agent, or Firm* — Buchanan Ingersoll & Rooney PC

(57) ABSTRACT

A sealing arrangement is provided at the interface between a combustor and a turbine of a gas turbine. The turbine includes guiding vanes at its inlet. The guiding vanes are each mounted within the turbine at their outer diameter by means of rear outer diameter vane hook and are each at their inner diameter in sealing engagement by means of a front inner diameter vane tooth with a honeycomb seal arranged at the corresponding inner diameter part of the outlet of said combustor. The rear outer diameter vane hook allows a relative movement of the guiding vane in form of a rotation around the rear outer diameter vane hook. The sealing adapts the front inner diameter vane tooth and the corresponding honeycomb seal in their configuration to the rotating relative movement of the guiding vane, such that the compression of said honeycomb seal through transients of the gas turbine is reduced.

12 Claims, 5 Drawing Sheets

(51) Int. Cl.
*F02C 7/28* (2006.01)
*F02C 3/04* (2006.01)
*F02C 9/22* (2006.01)
*F23R 3/60* (2006.01)

(52) U.S. Cl.
CPC ........ *F01D 11/003* (2013.01); *F05D 2220/32* (2013.01); *F05D 2240/12* (2013.01); *F05D 2240/55* (2013.01); *F05D 2250/283* (2013.01); *F23R 3/60* (2013.01)

(58) Field of Classification Search
CPC . F05D 2240/55; F05D 2250/283; F16J 15/44; F16J 15/447; F16J 15/4478
See application file for complete search history.

(56) References Cited

U.S. PATENT DOCUMENTS

| | | | | | |
|---|---|---|---|---|---|
| 3,966,353 | A * | 6/1976 | Booher, Jr. | ............. | F01D 9/042 415/115 |
| 4,768,924 | A * | 9/1988 | Carrier | .................... | F01D 5/284 415/138 |
| 5,215,435 | A * | 6/1993 | Webb | .................... | F01D 5/08 277/414 |
| 5,238,364 | A * | 8/1993 | Kreitmeier | ............. | F01D 5/225 415/171.1 |
| 5,290,144 | A * | 3/1994 | Kreitmeier | ............. | F01D 5/225 415/171.1 |
| 5,358,374 | A * | 10/1994 | Correia | .................. | F01D 5/081 415/115 |
| 5,785,492 | A * | 7/1998 | Belsom | ................. | F01D 25/246 415/173.1 |
| 6,062,813 | A * | 5/2000 | Halliwell | .................. | F01D 9/04 415/173.1 |
| 6,171,052 | B1 * | 1/2001 | Aschenbruck | .......... | F01D 11/10 415/173.1 |
| 6,251,494 | B1 * | 6/2001 | Schreiber | ............. | F01D 11/127 228/181 |
| 6,471,216 | B1 * | 10/2002 | Brainch | .................. | F01D 11/02 277/418 |
| 7,178,340 | B2 * | 2/2007 | Jorgensen | ............... | F01D 9/023 415/138 |
| 7,553,126 | B2 * | 6/2009 | Charier | .................. | F01D 17/14 415/128 |
| 8,388,307 | B2 * | 3/2013 | Smoke | ..................... | F01D 9/02 415/134 |
| 9,145,788 | B2 * | 9/2015 | Adaickalasamy | .... | F01D 11/122 |
| 9,708,920 | B2 * | 7/2017 | Tschuor | .................. | F01D 9/023 |
| 2002/0154992 | A1 * | 10/2002 | Tiemann | ................. | F01D 11/08 415/173.1 |
| 2004/0265118 | A1 * | 12/2004 | Naik | ........................ | F01D 5/145 415/116 |
| 2005/0063816 | A1 * | 3/2005 | Jorgensen | ............... | F01D 9/023 415/110 |
| 2005/0123389 | A1 | 6/2005 | Morris et al. | | |
| 2006/0034685 | A1 * | 2/2006 | Kizuka | ................... | F01D 5/081 415/191 |
| 2007/0122270 | A1 * | 5/2007 | Brueckner | ............. | F01D 9/042 415/191 |
| 2007/0273104 | A1 * | 11/2007 | Kovac | .................... | F01D 11/001 277/414 |
| 2008/0061515 | A1 * | 3/2008 | Durocher | ............. | F01D 11/001 277/414 |
| 2008/0258404 | A1 * | 10/2008 | Pillhoefer | ............... | C23C 10/02 277/415 |
| 2009/0014964 | A1 * | 1/2009 | Pu | ........................ | F01D 11/001 277/414 |
| 2010/0170035 | A1 * | 7/2010 | Kik, Sr. | .................. | A47K 3/40 4/613 |
| 2011/0014054 | A1 * | 1/2011 | Nagler | .................... | F01D 5/005 416/220 R |
| 2013/0189073 | A1 * | 7/2013 | Adaickalasamy | .... | F01D 11/122 415/1 |
| 2014/0017072 | A1 * | 1/2014 | McCaffrey | ............ | F01D 11/127 415/173.1 |
| 2014/0223921 | A1 * | 8/2014 | Tschuor | .................... | F23R 3/60 60/800 |
| 2015/0176424 | A1 * | 6/2015 | Simon-Delgado | .... | F01D 11/001 60/799 |
| 2016/0153294 | A1 * | 6/2016 | Graf | ........................ | F01D 9/023 415/208.2 |
| 2016/0281522 | A1 * | 9/2016 | Graf | ........................ | F01D 9/00 |
| 2018/0100439 | A1 * | 4/2018 | Escudero Olano | ..... | F01D 9/041 |

FOREIGN PATENT DOCUMENTS

CN 102953769 A 3/2013
EP 1 967 700 A2 9/2008

* cited by examiner

SEALING ARRANGEMENT AT THE INTERFACE BETWEEN A COMBUSTOR AND A TURBINE OF A GAS TURBINE AND GAS TURBINE WITH SUCH A SEALING ARRANGEMENT

CROSS-REFERENCE TO RELATED APPLICATIONS

This application claims priority to EP Application No. 14185021.4 filed Sep. 16, 2014, the contents of which are hereby incorporated in its entirety.

TECHNICAL FIELD

The present invention relates to the technology of gas turbines. It refers to a sealing arrangement at the interface between a combustor and a turbine of a gas turbine according to the preamble of claim 1.

It further refers to a gas turbine with such a sealing arrangement.

BACKGROUND

Gas turbines generally comprise a compressor, a combustor and a turbine. The compressor compresses air, which is then fed to a combustor to be used to burn a fuel. The resulting hot gas leaves the combustor and enters the turbine along a hot gas path. Usually, a ring of guiding vanes is arranged at the turbine inlet. To prevent compressed air from entering the hot gas path, seals must be provided at various places along the hot gas path. Especially, at the interface between the combustor and the turbine special honeycomb seals are used for sealing (see for example document U.S. Pat. No. 7,178,340).

The sealing situation at the combustor/turbine interface is shown in detail in FIG. 1. In FIG. 1, the hot gas path 40 guides hot gas 13 from a combustor 11 to turbine 12 of gas turbine 10 through the combustor/turbine interface. At the inlet of turbine 12 a circumferential ring of guiding vanes 14 is arranged. Each guiding vane 14 comprises an airfoil 17 extending in radial direction between an inner diameter platform 14a and an outer diameter platform 14b. The vanes 14 each are hooked into a support at the outer casing by means of a rear outer diameter hook 15 at the rear end of the outer diameter platform 14b (see upper circle in FIG. 1). Opposite to the rear outer diameter hook 15, there is a sealing arrangement 18 at the front end of the inner diameter platform 14a (see lower circle in FIG. 1), where a vane tooth 19 is in sealing engagement with honeycomb seal 20 (shown in even more detail in FIG. 2) and its sealing surface 21. The vanes 14 are supported on the inner platform by a holding structure 42. Transient thermal behaviour between the inner and the outer structure of the gas turbine lead to relative movement 43.

The particular requirement to the seal location or sealing arrangement 18 is that relative axial and radial movements have to be accommodated by the seal 20. This is supposed to be done via elastic deformation of the honeycomb. A tight sealing at the sealing arrangement 18 is important to prevent cooling air bypass around the combustor 11 into the hot gas path 40, leading to higher flame temperature and higher NOx emissions and to a larger degree of temperature non-uniformity at the turbine inlet of turbine 12. The problem is that ageing and deterioration wears the seal or the seal is plastically deformed. Both effects may lead to an increase of the leakage gap.

SUMMARY

It is an object of the present invention to provide a sealing arrangement at the combustor/turbine interface, which reduces or even eliminates such seal weakness in a simple and cost-effective way.

It is a further object of the invention to provide a gas turbine with such a sealing arrangement.

These and other objects are obtained by a sealing arrangement according to Claim 1 and a gas turbine according to Claim 11.

The sealing arrangement according to the invention is provided at the interface between a combustor and a turbine of a gas turbine, said turbine comprising guiding vanes at its inlet, which guiding vanes are each mounted within said turbine at their outer diameter by means of an rear or close to rear outer diameter vane hook and are each at their inner diameter in sealing engagement by means of a front inner diameter vane tooth with a honeycomb seal arranged at the corresponding inner diameter part of the outlet of said combustor, whereby said rear outer diameter vane hook allows a relative movement of said guiding vane in form of a rotation around said rear outer diameter vane hook.

It is characterized in that said front inner diameter vane tooth and the corresponding honeycomb seal are adapted in their configuration to said rotating relative movement of said guiding vane, such said the compression of said honeycomb seal through transients of the gas turbine is reduced.

An embodiment of the sealing arrangement according to the invention is characterized in that said front inner diameter vane tooth and the corresponding honeycomb seal are adapted in their shape to said rotating relative movement of said guiding vane.

Specifically, said honeycomb seal has a sealing surface, which is in alignment with the tangential direction of the rotating relative movement of said guiding vane.

More specifically said front inner diameter vane tooth has a contacting surface, which is in general alignment with said sealing surface of said honeycomb seal.

Furthermore, said contacting surface may be parallel with said sealing surface.

Alternatively, said contacting surface may be more inclined with respect to the axial direction of the machine than said sealing surface.

Another embodiment of the sealing arrangement according to the invention is characterized in that the honeycomb cells of said honeycomb seal are adapted in their orientation to said rotating relative movement of said guiding vane.

Specifically, said honeycomb seal may have a sealing surface in alignment with the tangential direction of the rotating relative movement of said guiding vane, and the honeycomb cells of said honeycomb seal may be all in alignment with the tangential direction of the rotating relative movement of said guiding vane.

Alternatively, said honeycomb seal may have a sealing surface in alignment with the tangential direction of the rotating relative movement of said guiding vane, and the said honeycomb seal may be pre-deformed such that the honeycomb cells of said honeycomb seal are in growing alignment with the tangential direction of the rotating relative movement of said guiding vane, with decreasing distance from a sealing surface.

The inventive gas turbine comprises a sealing arrangement according to the invention.

BRIEF DESCRIPTION OF THE DRAWINGS

The present invention is now to be explained more closely by means of different embodiments and with reference to the attached drawings.

DETAILED DESCRIPTION

The basic idea of the present invention is to reduce the compression of the seal through transients through appropriate shaping and/or configuring.

Figure 1:
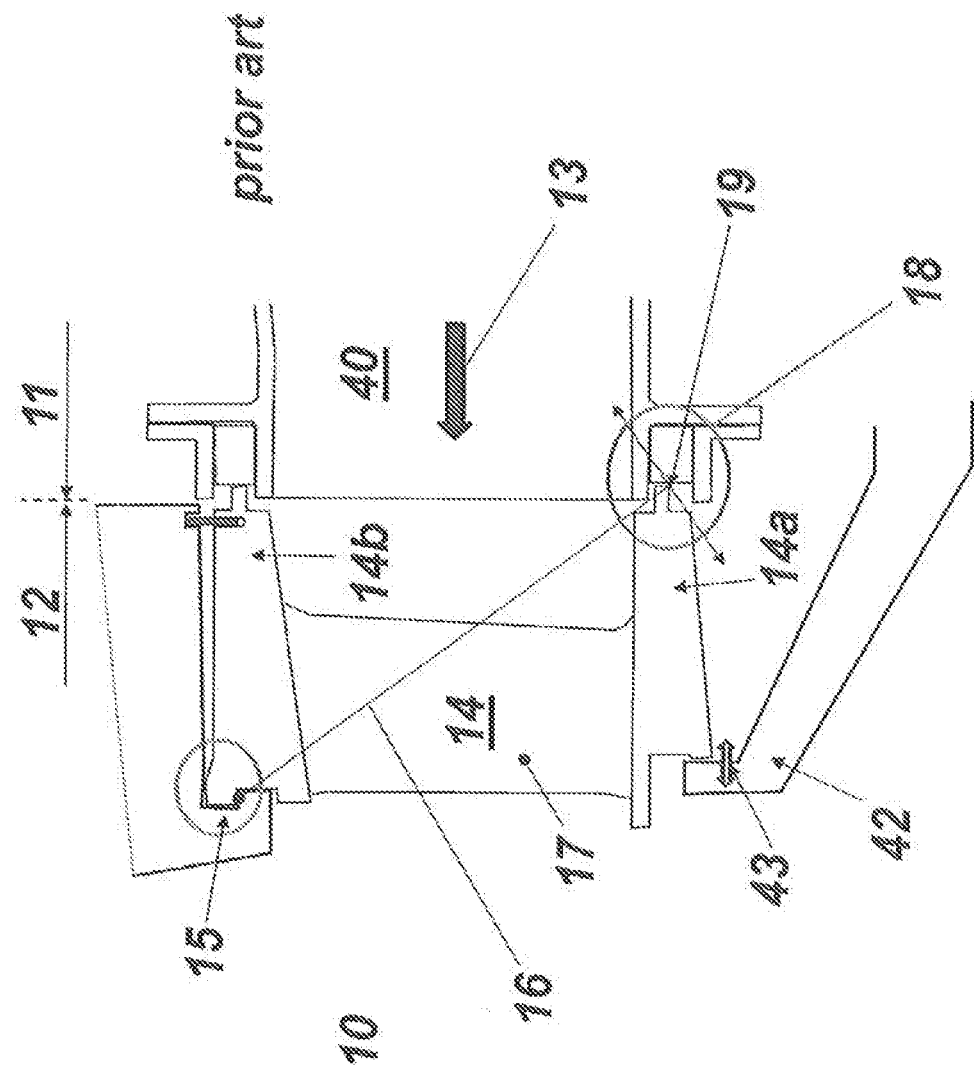
FIG. 1 shows in detail a interface between the combustor and the turbine of a gas turbine according to the prior art.
Figure 2:
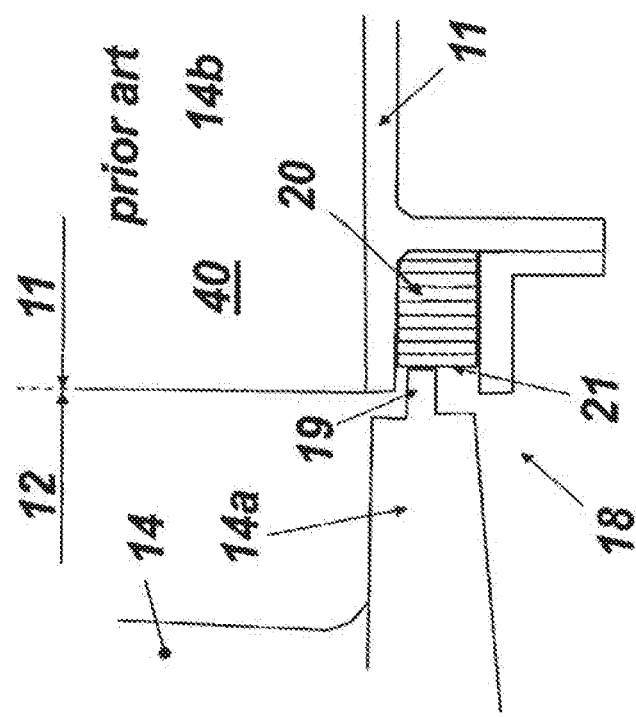
FIG. 2 shows in more detail the sealing arrangement at the front end of the inner diameter platform of the interface of FIG. 1.

In a configuration shown in FIG. 1 the dominating relative movement of the vanes 14 is a rotation around the rear outer diameter vane hook 15 with radius vector 16.

Figure 3:
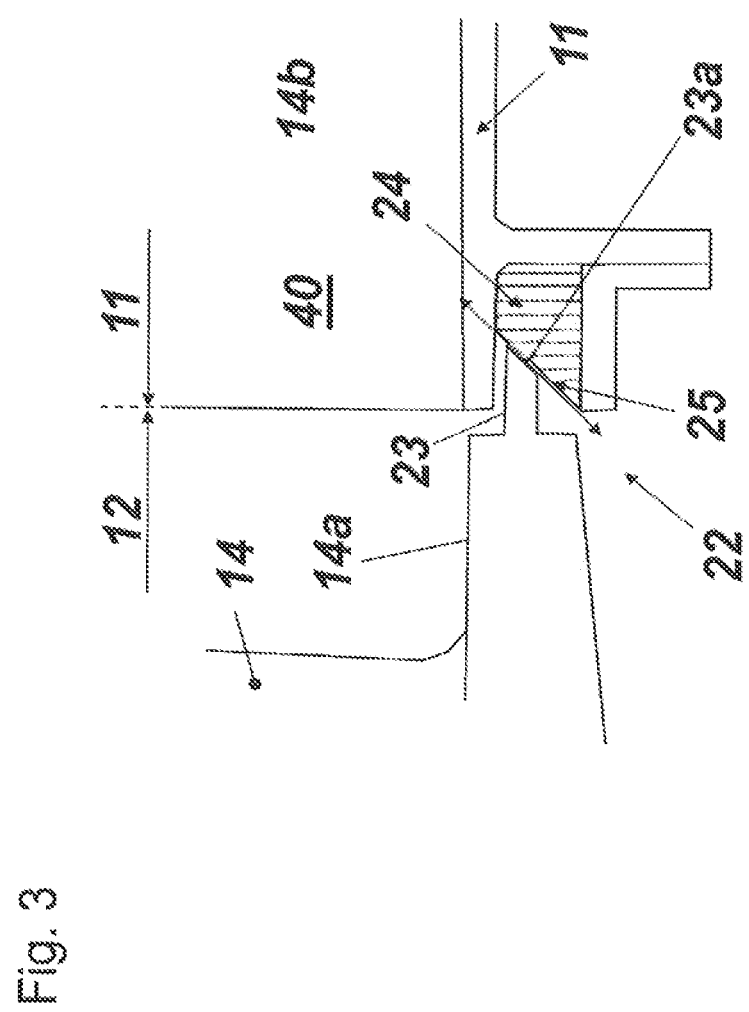
FIG. 3 shows an embodiment of the sealing arrangement according to the invention with aligned sealing surfaces.

As shown in FIG. 3, in a first embodiment of the invention, the contacting surface 23a of vane tooth 23 and the sealing surface 25 of honeycomb seal 24 are oriented in parallel to the relative movement of vane 14, or in tangential direction with respect to radius vector 16. However, the direction of compression of the honeycomb is still oriented along the axial direction of the machine for reasons of easy manufacturing and assembly.

An alternative would be to rotate the honeycomb cells by the same angle, i.e. make them parallel to the sealing surface. This would increase manufacturing cost but improve resistance to wear and contact between vane tooth and seal. Otherwise, the sealing surface would be formed by cells which have been cut through, which will delaminate rapidly and then small steps between levels of cells will be created.

Figure 4:
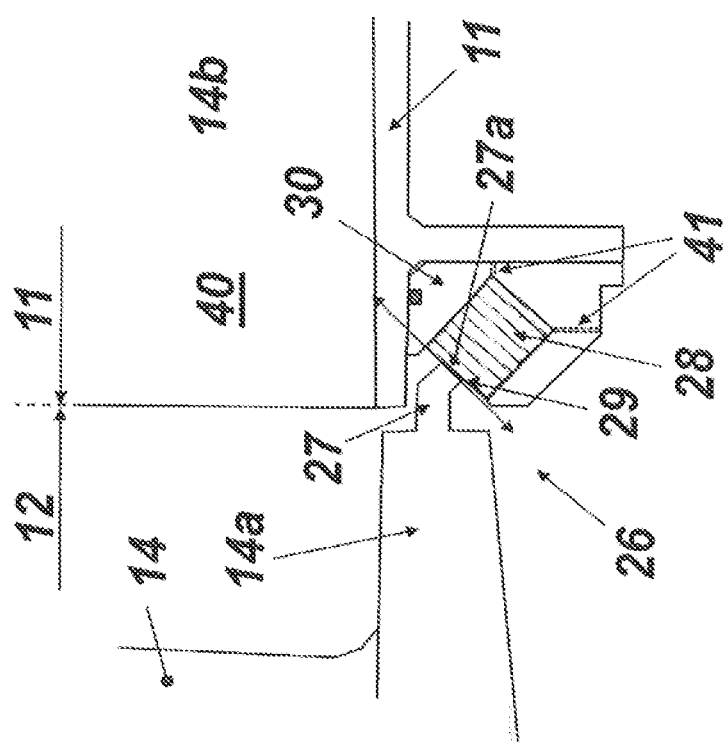
FIG. 4 shows another embodiment of the sealing arrangement according to the invention with aligned sealing surfaces and honeycomb cells.

Such an alternative design is shown in FIG. 4. The sealing arrangement of FIG. 4 comprises a vane tooth 27 with an inclined contacting surface 27a similar to FIG. 3 and a honeycomb seal 28 with a correspondingly inclined sealing surface 29 similar to FIG. 3, which is held in a seal carrier 30. The seal carrier 30 can be split to reduce clearance between seal 28 and seal carrier 30. There again, the direction of compression is radial to the centre of rotation of the vane 14, i.e. the rear outer diameter hook 15. Now, the honeycomb cells are also inclined in accordance with the lines drawn in seal 28. This minimizes radial forces to the seal which is beneficial to reduce leakage with a seal that has increased clearance, for both, design clearance and degraded material.

Figure 5:
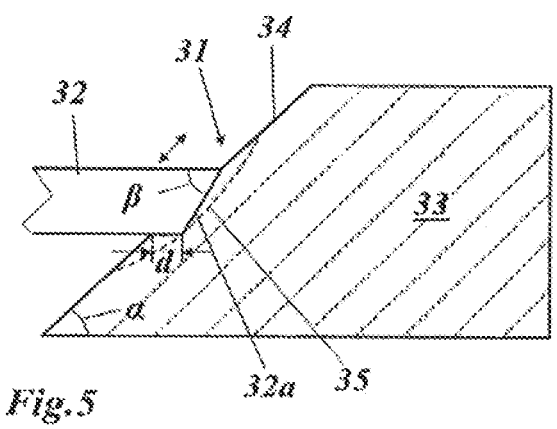
FIG. 5 shows a further embodiment of the sealing arrangement according to the invention with differently aligned sealing surfaces.

An alternative design for the vane tooth is shown in FIG. 5. In the sealing arrangement 31 of FIG. 5 the edge of vane tooth 32 is produced with an angle β (for example 50°), which is bigger than angle α (for example 45°) of the inclined sealing surface 34 such that the seal crush is a distance d (for example of ~1 mm) higher in the bottom part than in the top part of tooth 32. This improves the contact between vane tooth 32 and honeycomb seal 33 while keeping deformation elastic, so the seal can recover its shape from an elastic deformation 35 (dashed line in FIG. 5).

Figure 6:
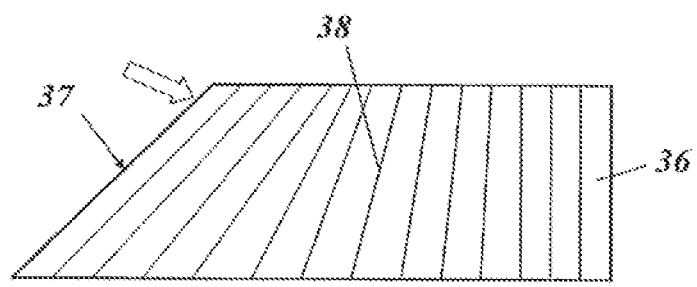
FIG. 6 shows a honeycomb seal for a sealing arrangement according to the invention with pre-deformed, gradually aligned honeycomb cells.

An alternative design is shown in FIG. 6. There the honeycomb cells 38 of the honeycomb seal 36 with its inclined sealing surface 37 are pre-deformed (see the block arrow in FIG. 6) to get the desired end shape. Final machining of the outer and inner sealing interfaces can be done before or preferably after pre-bending. This allows the height of the honeycomb seal to be reduced to a minimum which is beneficial for manufacturing.

The advantages of the sealing arrangement according to the invention are:

Less compression, therefore less elastic and plastic deformation of the seal. In essence, a larger axial displacement can be accommodated with a given seal dimension. Actually, the deformation would be mostly elastic, which means that the seal will recover its shape after being crushed.

The contact between vane tooth and seal is ensured at steady-state even if the seal is heavily clamped (i.e. pressure activation is not needed).

Finally, a more robust design against wear and undesired leakage is possible, which would reduce the risk of an increase of flame temperature and emissions.

When compressed, the honeycomb elongates circumferentially. This space must be provided in the design and creates an additional leakage path. Less compression means also that less circumferential space has to be provided, which means less secondary leakage.

The invention claimed is:

1. A sealing arrangement at an interface between a combustor and a turbine of a gas turbine, said turbine comprising:

at least one guiding vane at an inlet of the turbine, wherein the at least one guiding vane is mounted within said turbine at their outer diameter by a rear outer diameter vane hook, and at their inner diameter in sealing engagement by a front inner diameter vane tooth with a honeycomb seal configured to be arranged at a corresponding inner diameter part of an outlet of the combustor; and the rear outer diameter vane hook is arranged to allow a relative rotation of the at least one guiding vane around said rear outer diameter vane hook, said front inner diameter vane tooth and the honeycomb seal are configured relative to said rotation of said at least one guiding vane, such that a contacting surface of the front inner diameter vane tooth is arranged in parallel to a sealing surface of the honeycomb seal, and is arranged orthogonally to the rotation of the at least one guiding vane to reduce compression of said honeycomb seal, wherein the contacting surface of the front inner diameter vane tooth bends towards the centerline axis of the gas turbine and extends towards the honeycomb seal.

2. The sealing arrangement as claimed in claim 1, wherein said front inner diameter vane tooth and the honeycomb seal are shaped to said rotation of said at least one guiding vane.

3. The sealing arrangement as claimed in claim 1, wherein honeycomb cells of said honeycomb seal are oriented to said rotation of said at least one guiding vane.

4. The sealing arrangement as claimed in claim 3, wherein the sealing surface is orthogonal to the rotation of said at least one guiding vane, and the honeycomb cells are all orthogonal to the rotation of said at least one guiding vane.

5. The sealing arrangement as claimed in claim 3, wherein said honeycomb seal comprises:

a sealing surface in alignment with an tangential direction of the rotating relative movement of said guiding vane, and the said honeycomb seal is pre-deformed such that the honeycomb cells of said honeycomb seal are in growing alignment with the tangential direction of the rotating relative movement of said guiding vane, with decreasing distance from the sealing surface.

6. The sealing arrangement as claimed in claim 1, wherein said rear outer diameter vane hook is arranged at a rear end of the at least one guiding vane.

7. A gas turbine, comprising:
a combustor; and
the sealing arrangement according to claim 1.

8. A sealing arrangement at an interface between a combustor and a turbine of a gas turbine, the turbine comprising:
at least one guiding vane at an inlet of the turbine, wherein the at least one guiding vane is mounted within said turbine at their outer diameter by a rear outer diameter vane hook, and at their inner diameter in sealing engagement by a front inner diameter vane tooth with a honeycomb seal configured to be arranged at a corresponding inner diameter part of an outlet of the combustor; and
the rear outer diameter vane hook is arranged to allow a relative rotation of the at least one guiding vane around said rear outer diameter vane hook, the front inner diameter vane tooth and the honeycomb seal are configured relative to the rotation of the at least one guiding vane, wherein a contacting surface of the front inner diameter vane tooth is more inclined with respect to an axial direction of the turbine than a sealing surface of the honeycomb seal, such that a seal crush distance is greater at the bottom than the top of the front inner diameter vane tooth, wherein the contacting surface of the front inner diameter vane tooth bends towards the centerline axis of the gas turbine and extends towards the honeycomb seal.

9. A gas turbine, comprising:
a combustor; and
the sealing arrangement according to claim 8.

10. The sealing arrangement as claimed in claim 8, wherein compression of the honeycomb seal through transients of the gas turbine is reduced during operation.

11. The sealing arrangement as claimed in claim 8, wherein the front inner diameter vane tooth and the honeycomb seal are shaped to the rotation of the at least one guiding vane.

12. The sealing arrangement as claimed in claim 11, wherein the sealing surface is aligned to be orthogonal to the axis of rotation of the at least one guiding vane.

* * * * *